No. 2,839.                                          PATENTED NOV. 4, 1842.
J. HARLACHER.
MANNER OF COMBINING AN APPARATUS FOR DISENGAGING HORSES
FROM CARRIAGES AND OF A DRAG FOR ARRESTING THE MOTION THEREOF.
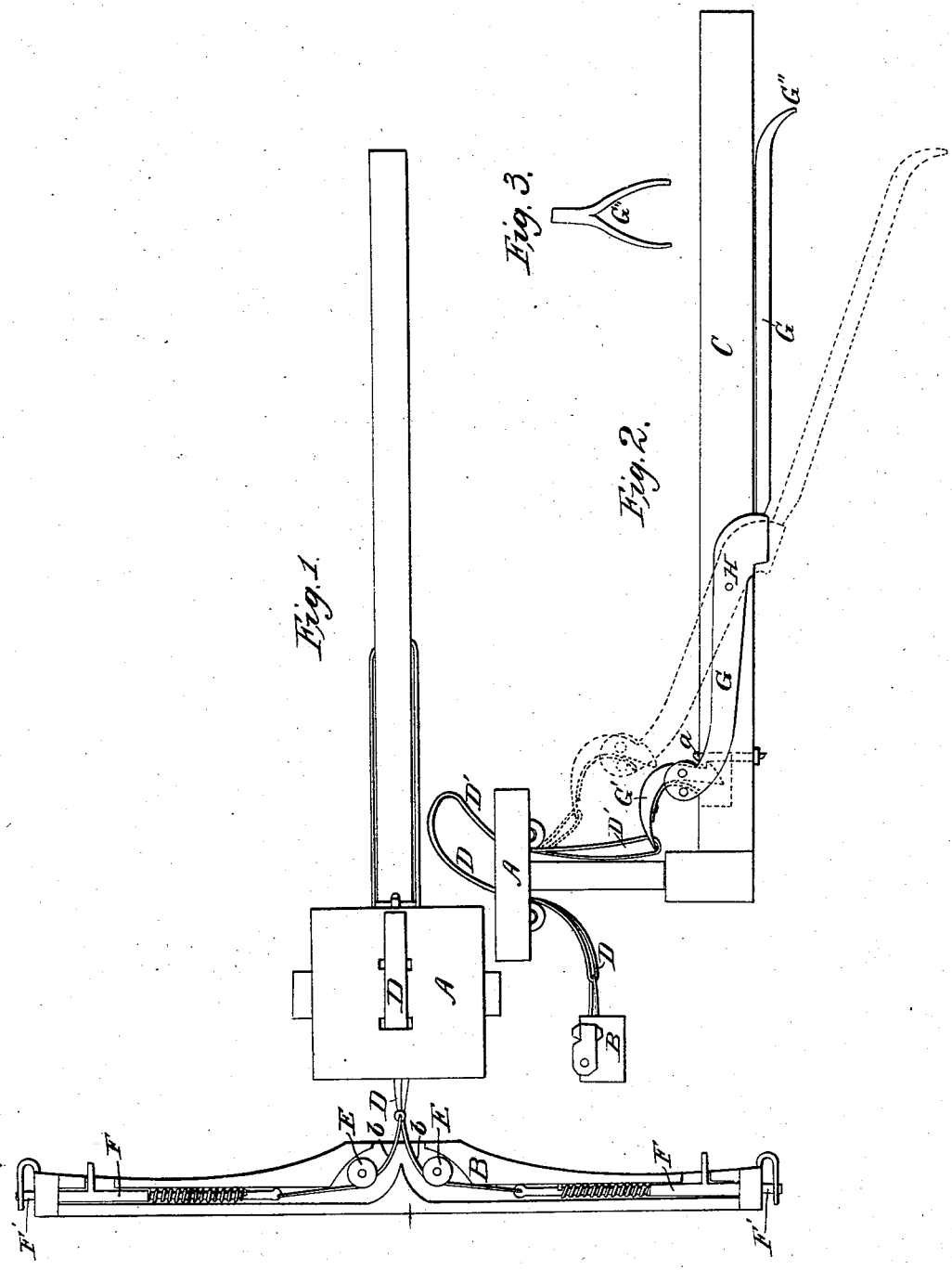

UNITED STATES PATENT OFFICE.

JACOB HARLACHER, OF LANCASTER, PENNSYLVANIA.

MANNER OF COMBINING APPARATUS FOR DISENGAGING HORSES FROM CARRIAGES AND OF DRAGS FOR ARRESTING THE MOTION THEREOF.

Specification of Letters Patent No. 2,839, dated November 4, 1842.

*To all whom it may concern:*

Be it known that I, JACOB HARLACHER, of Lancaster, in the county of Lancaster and State of Pennsylvania, have invented a new and useful manner of combining an apparatus for disengaging horses from carriages with one for arresting the motion of the carriages by means of a drag; and I do hereby declare that the following is a full and exact description thereof.

For the purpose of disengaging the horse, or horses, in case of their running away, I so connect a strap or line, with two spring bolts by the outer end of which the traces are held, as that the driver, by drawing upon said strap or line, may retract the bolts, and liberate the horse, or horses from the shaft and may also raise and hold up the shafts so as to prevent their falling and coming into contact with the ground. For the purpose of arresting the motion of the carriage, I place a lever along the perch of the carriage, which lever is so constructed that its rear end shall form a forked drag, which may be brought into contact with the ground by drawing upon the opposite end of the said strap, or line, or of a separate strap or line attached thereto.

In the accompanying drawing Figure 1 is a plan, or top view of a perch, foot board, and swingle tree, the latter having the disengaging apparatus attached thereto. Fig. 2, is a side view of the same, showing the manner of attaching and operating the drag lever.

A is the footboard of the driver; B, the swingle tree; and C, the perch.

The body of the carriage, the shafts, axles, wheels, and other parts are not represented as they are not necessary to the explanation of the improvements made by me.

D, is a strap, which passes through an opening in the board A; and which when dividing into two parts $b$, $b$, passes around friction rollers E E on the swingle tree B, and has its ends attached to spring bolts F F. The outer ends F', F', of these bolts hold the rear ends of the traces, and when they are retracted by drawing upon the strap D, the horse will be liberated. The spiral springs which surround the bolts F F, serve to keep them up to their bearings when not forcibly drawn back. The swingle tree being attached by its middle to the shafts; the same force which retracts the bolts will by its being continued, also serve to raise the shafts, and may be made to bring them into a vertical position.

G G, Fig. 2, is the drag lever, which is ordinarily held in the position represented, in contact with the perch, by the latch hook G', to which the strap D', is attached. The end G'' of this lever should be forked, as shown in Fig. 3. By drawing upon the strap D', the hook G' will be liberated from its catch $a$, and the lever G, turning on its fulcrum H, will have its forked end G'' brought into contact with the ground, against which it may be made to bear with a degree of force proportioned to that exerted on the strap D'. This position of the lever is represented by the dotted lines.

I am aware that horses have been disengaged from carriages in a manner nearly resembling that above described, but in some cases the swingle tree has remained attached to the traces to the great danger of the horse; the shafts have likewise been allowed to fall down, and consequently to endanger the destruction of the carriage and the safety of the rider. But the most imminent peril has been from the ungoverned momentum of the carriage; and this I effectually obviate by combining my drag lever with the disengaging apparatus in such manner as that the drag shall take hold of the ground at the rear part of the carriage, and be made to bear thereon with a degree of force proportioned to that exerted by, and under the command of the driver. I do not, therefore, claim the disengaging of the horse, or horses, from a carriage, in the manner herein set forth, when uncombined with a lever drag for arresting the motion of a carriage; but I do claim—

The combining with such disengaging apparatus, the lever drag and its appendages, arranged and operating substantially as herein set forth.

JACOB HARLACHER.

Witnesses:
THOS. P. JONES,
I. D. HEISTAND.